US010662301B2

(12) United States Patent
Krause et al.

(10) Patent No.: US 10,662,301 B2
(45) Date of Patent: May 26, 2020

(54) METHOD FOR PRODUCING A LIGNOCELLULOSE PLASTIC COMPOSITE MATERIAL

(71) Applicant: Universitaet Hamburg, Hamburg (DE)

(72) Inventors: Andreas Krause, Lohbruegge (DE); Oliver Mertens, Lohmar (DE); Othar Kordsachia, Oststeinbek (DE)

(73) Assignee: Universitaet Hamburg, Hamburg (DE)

( * ) Notice: Subject to any disclaimer, the term of this patent is extended or adjusted under 35 U.S.C. 154(b) by 58 days.

(21) Appl. No.: 15/759,329

(22) PCT Filed: Aug. 16, 2016

(86) PCT No.: PCT/DE2016/200380
§ 371 (c)(1),
(2) Date: Mar. 12, 2018

(87) PCT Pub. No.: WO2017/045676
PCT Pub. Date: Mar. 23, 2017

(65) Prior Publication Data
US 2018/0258242 A1    Sep. 13, 2018

(30) Foreign Application Priority Data

Sep. 14, 2015  (DE) .................. 10 2015 115 472

(51) Int. Cl.
*C08J 5/04*        (2006.01)
*B29B 7/92*        (2006.01)
(Continued)

(52) U.S. Cl.
CPC .............. *C08J 5/045* (2013.01); *B01F 3/1221* (2013.01); *B01F 3/14* (2013.01); *B01F 3/2078* (2013.01);
(Continued)

(58) Field of Classification Search
CPC . C08J 5/045; C08J 3/12; B01F 3/1221; B01F 3/14; B01F 3/2078; B01F 13/1041; B01F 8013/1041; B29B 7/92; B29B 13/10
See application file for complete search history.

(56) References Cited

U.S. PATENT DOCUMENTS 5,624,616 A  *  4/1997  Brooks ................. B27N 1/00
                                                162/10
2006/0186233 A1     8/2006  Holm et al.

FOREIGN PATENT DOCUMENTS

DE    102007054549 A1    5/2009
DE    102013101667 A1    8/2014
(Continued)

OTHER PUBLICATIONS

International Search Report dated Jan. 18, 2017, in International Application No. PCT/DE2016/200380.

*Primary Examiner* — John E Uselding
(74) *Attorney, Agent, or Firm* — Patent Central LLC; Stephan A. Pendorf

(57) ABSTRACT

A method for producing a lignocellulose plastic composite material, in particular a simpler and more cost-effective option for producing lignocellulose plastic composite materials. Thermoplastic particles and a mixture of water and lignocellulose-containing particles are supplied to a refiner, and the lignocellulose-containing particles are reduced to fibers in the refiner. The thermoplastic particles are supplied to the refiner in a melted or fused state, or are melted or fused in the refiner, so that the melted or fused thermoplastic particles and the lignocellulose-containing particles that are reduced to fibers form material composite particles in the refiner.

10 Claims, 2 Drawing Sheets

(51) Int. Cl.
*C08J 3/12* (2006.01)
*B29B 13/10* (2006.01)
*B01F 3/12* (2006.01)
*B01F 3/14* (2006.01)
*B01F 3/20* (2006.01)
*B01F 13/10* (2006.01)
*B29B 9/16* (2006.01)
*B29B 7/40* (2006.01)

(52) U.S. Cl.
CPC ............ *B01F 13/1041* (2013.01); *B29B 7/92* (2013.01); *B29B 13/10* (2013.01); *C08J 3/12* (2013.01); *B01F 2013/1086* (2013.01); *B01F 2215/0049* (2013.01); *B29B 7/40* (2013.01); *B29B 9/16* (2013.01); *C08J 2323/06* (2013.01); *C08J 2323/12* (2013.01)

(56) References Cited

FOREIGN PATENT DOCUMENTS

| WO | 2005002817 | A1 | 1/2005 |
| WO | 2006119752 | A2 | 11/2006 |
| WO | 2013137449 | A1 | 9/2013 |

* cited by examiner

METHOD FOR PRODUCING A LIGNOCELLULOSE PLASTIC COMPOSITE MATERIAL

The invention relates to a method for producing a lignocellulose plastic composite material and a lignocellulose plastic composite material that is or can be produced by this method.

Raw materials containing lignocellulose, such as wood, bamboo or various natural fibers are being used more and more frequently as reinforcing components or fillers in composite materials. This is done because of a shortage of raw materials and also for reasons of sustainability. In addition to that, special properties such as increased rigidity and dimensional stability in the heat are achieved. So-called wood-plastic composites (WPCs) or natural fiber-reinforced polymer composites (NFCs) are used mainly in the construction industry (for example, in terrace construction) or in the automobile industry (for example, for interior door paneling). In 2012, WPCs and NFCs had already achieved a market share of 15% (352,000 [metric] tons) of the composite materials produced in Europe. However, another marked increase in production volume is expected. Production is even expected to double in certain fields of application, such as the construction field or the automotive industry (Cams and Eder 2014, Wood-Plastic Composites (WPCs) and Natural Fibre Composites (NFC): European and Global Markets 2012 and Future Trends). The reason for these predictions is an increasing demand for materials produced from renewable raw materials.

For producing lignocellulose-plastic composite materials (compounds), also abbreviated LPCs, it is known that preferably extruders, corotational twin-screw extruders and also internal mixer-kneaders and internal kneaders with ram are used in particular. To do so, the individual components (lignocellulose, plastic and optional additives) must be dried and processed, ready for dosing, in multiple process steps prior to extrusion. After processing (milling), which is usually an energy-intensive process, the materials are sent to the screw channel of the extruder through appropriate devices, then melted and mixed in the screw channel and discharged through a nozzle at the end of the process, then cooled and granulated.

In the production of LPC with an extruder or an internal mixing kneader, various publications mention the use of refiner fibers (RMP=refiner mechanical pulp, TMP=thermomechanical pulp, CTMP=chemothermo mechanical pulp) as a reinforcing element in a thermoplastic matrix (Lerche, Henrik; Benthien, Jan T.; Schwarz, Katrin U.; Ohlmeyer, Martin, 2013, Effects of Defibration Conditions on Mechanical and Physical Properties of Wood Fiber/High-Density Polyethylene Composites. In: Journal of Wood Chemistry and Technology 34 (2), 98-110; Peltola, H.; Laatikainen, E.; Jetsu, P., 2011, Effects of physical treatment of wood fibres on fibre morphology and biocomposite properties. In: Plastics, Rubber and Composites 40 (2), 86-92).

The results of the published studies have shown that the strength of the composite materials can be greatly increased by using refiner fibers. The reason for this is that in addition to having a good length-to-diameter ratio (L/D ratio) of the fibers, they also have a large fiber surface area. An enlarged fiber surface area increases the contact area in the case of a melted polymer and thereby improves the strength properties of the composite material. In the past, such compounds have been produced using refiner fibers, but only in small quantities due to the combination of multiple process steps.

Direct compounding of fibers has been impossible in the past. The reasons for this are as follows:

Bulk weight: Refiner fibers and fibers in general have a very low bulk density. The reason for this is that the fibers mutually maintain their distance from one another, and therefore a great deal of air is present between them. The air causes problems in the following processes because it must be removed from the material during processing. This means that processes are slower (lower throughput) and require a greater technical outlay, for example, more and larger vent openings. One approach to solving this problem is to pelletize the fibers. In doing so, the fibers are pressed and compacted by a die, so that they form a pourable substance. Production of pellets is not only associated with additional costs and an additional process step but also with a shortening of the fibers, which occurs due to pressing by the die. Such shortening of the fibers has a negative effect on the strength properties of the composite (Bengtsson, Magnus; Le Baillif, Marie; Oksman, Kristiina, 2007, Extrusion and mechanical properties of highly filled cellulose fibre-polypropylene composites. In: Composites Part A: Applied Science and Manufacturing 38 (8), 1922-1931). In addition, this results in agglomerates, which can no longer be adequately dispersed (mixed) with the polymer. There is no known industrial production in which pelletized fibers are used.

Moisture: In general, lignocellulose-containing material must be kiln dried before thermoplastic processing because an excessively high moisture content, on the one hand, results in processes that are difficult to control (sudden escape of steam) and, on the other hand, the necessary evaporation of the water content is associated with a high energy consumption. Lignocelluloses absorb moisture from their surroundings because of their hygroscopic properties, so that even after drying, moisture again enters the composite. This means that water and material are absorbed even after drying and then must be evaporated again during the processing operation.

Dosability: Because of the low bulk weight, the fibers maintain a mutual distance from one another and become entangled, thereby interfering with dosing in a continuous processing operation. Drying the material reduces the flexibility of refiner fibers, i.e., they become stiffer and have an additional tendency to become entangled. If this occurs, there is increased development of bridges at the material intake, thereby preventing automatic further conveyance.

Formation of agglomerates: Due to the drying process, agglomerates are also formed from finely divided, e.g., ground and/or fibrous, lignocellulose. These agglomerates have such a high internal strength that they cannot be separated in the subsequent compounding processes. Therefore, agglomerates that have a negative effect on the appearance as well as the technical properties of the compound are formed in the compound and in the end product.

The object of the present invention is to provide a possibility for producing lignocellulose-plastic composite materials, which is improved, in particular simpler and less expensive, in comparison with the prior art.

To solve this problem, the present invention provides a method for producing a lignocellulose-plastic composite material, wherein a. thermoplastic particles and a mixture of water and lignocellulose-containing particles are fed to a refiner, and
b. the lignocellulose-containing particles in the refiner are reduced to fibers,
and wherein the thermoplastic particles are fed to the refiner in melted or pre-melted form or are melted or pre-melted in the refiner so that the thermoplastic particles that are melted or pre-melted and the lignocellulose-containing particles that have been reduced to fibers form material composite particles in the refiner.

In the method according to the invention, lignocellulose-containing raw materials in the form of fibers, chips, shavings or sawdust and free-flowing thermoplastics are fed to a refiner. In the refiner the thermoplastic particles are combined in the melted or pre-melted state with lignocellulose particles that have been reduced to fibers to form a composite material. Thermoplastic material and lignocellulose-containing material are combined in a process so that a composite product (compound) is formed preferably for direct further processing in downstream thermoplastic processes. The present invention permits for the first time wet compounding of thermoplastics and lignocellulose-containing material.

Repeated drying canoe avoided with the method according to the invention, and compounding of thermoplastics and lignocellulose can be achieved without any additional destruction of the fibers. The compound produced in this way can be processed further using traditional shaping methods such as the thermoplastic technology (extrusion, injection molding, pressing methods). In addition, higher throughputs (production quantities) can be achieved with the method according to the invention than with a traditional compounding process.

The term "composite material" or "compound" is understood to refer to a material comprised of two or more materials combined by using a physically bonding method or a form-fitting method or a combination of the two. The composite material has other, usually better material properties than its individual components. A "lignocellulose-plastic composite material" is understood here to refer to a composite material comprised of one or more plastics, in particular a thermoplastic, and a lignocellulose-containing material.

The term "lignocellulose-containing material," which is optionally referred to as being synonymous with "lignocellulose material," is preferably understood here to be a material consisting of cellulose, hemicellulose and lignin in different amounts. However, this term does not only include a material consisting predominantly or completely of lignocellulose. Instead the term also includes lignin-free hemicellulose/cellulose fibers if the lignin has been partially or completely removed by a corresponding chemical digestion process (CTMP, cellulose or hemicellulose). This term also includes materials that contain other ingredients in addition to lignocellulose, hemicellulose and/or cellulose.

The term "lignocellulose-containing particles" refers to particles comprised of lignocellulose-containing material. Examples of lignocellulose-containing particles include wood shavings, wood chips, wood fibers and ground wood.

The phrase "mixture of water and lignocellulose-containing particles" is understood to refer to a mixture of lignocellulose-containing particles and added water, in particular a mixture of lignocellulose-containing particles, for example, wood particles and water, wherein the water content is greater than the fiber saturation of lignocellulose-containing particles, for example, wood particles. The term also includes mixtures containing additional ingredients in addition to water and lignocellulose-containing particles. In particular, however, the term also includes mixtures containing only water and lignocellulose-containing particles. An "aqueous suspension of lignocellulose-containing particles and thermoplastic particles" is understood to refer to a suspension of thermoplastic particles and lignocellulose-containing particles suspended in water. For example, the suspension may also contain additives, e.g., lubricants, adhesion promoters or the like.

The term "refiner" is understood to refer to a milling and/or pulverizing device which is generally used in the cellulose and/or woodpulp industry, where it is used for milling of lignocellulose material or reducing it to fibers to produce fiber materials. The lignocellulose, usually in the form of chips, sawdust or fiber material, is sent to the refiner. As a rule, refiners have a static grinding body (stator) and a rotating grinding body (rotor). A "disk refiner" is understood to refer to a refiner with opposing grinding disks, between which is formed a milling gap, where the material for milling is ground. In doing so, a grinding disk (rotor) usually rotates in relation to a second fixed grinding disk (stator). The term also includes refiners having more than two grinding disks, for example, double-disk refiners with double grinding sets and two milling gaps. The grinding disks are regularly provided with pulverizing devices, for example, segments (webs) distributed variously over the radius. The material to be milled is conveyed, for example, by a stop screw into the interior of the grinding disks in order to then ultimately be conveyed by the rotor and the resulting centrifugal forces to the outside of the housing. Depending on the grinding disk spacing and the grinding disk fittings, compression forces and frictional forces occur which produce the milling of the material (Gharehkhani, Samira; Sadeghinezhad, Emad; Kazi, Salim Newaz; Yaiinand, Hooman; Badarudin, Ahmad; Safaei, Mohammad Reza; Zubir, Mohd Nashrul Mohd, 2015, Basic effects of pulp refining on fiber properties—a review, In: Carbohydr Polym 115, 785-803) and have a substantial influence on the properties of the material. The material is discharged through openings arranged radially or tangentially on the refiner housing. In the industrial process the material is continuously supplied to and removed from the refiner.

The term "thermoplastic material" as used here is understood to refer to a thermoplastic polymer or a mixture of thermoplastic polymers. Thermoplastics are plastics that can be shaped reversibly in a certain temperature range (thermoplastic). Examples of thermoplastics include polyethylene (PE), polypropylene (PP), acrylonitrile-butadiene-styrene (ABS), polyamide (PA) [nylon], polylactate (PLA), polymethyl methacrylate (PMMA), polycarbonate (PC), polyethyleneterephthalate (PET), polystyrene (PS), polyether ether ketone (PEEK), thermoplastic starch (TPS) or polyvinyl chloride (PVC).

The term "in a melted or pre-melted state" with respect to thermoplastic particles means that they have been heated at least partially to a temperature above their glass transition temperature at their surface so that the particles are at least viscous in a partial region of their surface.

The quantity ratio between thermoplastic material and lignocellulose material is variable. The lignocellulose content is preferably between 10 and 90 wt %, especially preferably between 20 and 80 wt %, especially preferably between 30 and 70 wt %, based on the weight of the compound.

The thermoplastic particles may be in a melted or pre-melted state either only in the refiner, for example, due to shearing forces occurring there and/or due to heating of the refiner or they may be supplied to the refiner already in a melted or pre-melted state. In a preferred embodiment of the method according to the invention, the thermoplastic particles are melted or pre-melted primarily only in the refiner. The refiner may therefore have the corresponding heating equipment and/or may be heated through corresponding heating equipment. For example, grinding sets, for example, one or both grinding disks in the case of a disk refiner, can be heated electrically. Alternatively or additionally, the refiner may be heated by steam.

The thermoplastic particles which are optionally already in a melted or pre-melted state, and the mixture of water and lignocellulose-containing particles may be supplied to the refiner either separately or jointly. For example, the thermoplastic particles that are optionally already melted or pre-melted may be added to a mixture of water and lignocellulose-containing particles separately before the refiner and then sent to the refiner jointly with the mixture of water and the lignocellulose-containing particles. However, the thermoplastic particles, optionally already in a melted or pre-melted state, and the mixture of water and lignocellulose-containing particles may also be sent separately to the refiner and combined only after they are in the refiner. However, it is preferable for the thermoplastic particles and the mixture of water and lignocellulose-containing particles to be supplied jointly to the refiner. The thermoplastic particles here may optionally be melted or pre-melted by suitable means before being added to the mixture of water and lignocellulose-containing particles, preferably just upstream from the refiner.

In one embodiment of the method according to the invention, an aqueous suspension of lignocellulose-containing particles and thermoplastic particles is sent to the refiner, and the thermoplastic particles in the refiner are melted or pre-melted and the lignocellulose-containing particles are reduced to fibers, so that the melted or pre-melted thermoplastic particles and the lignocellulose-containing particles that have been reduced to fibers form material composite particles in the refiner.

The temperature in the refiner is preferably at or above the glass transition temperature of the thermoplastic particles. If a mixture of different thermoplastics with different glass transition temperatures is used in the thermoplastic particles, it is preferable for the temperature in the refiner to be at or above the glass transition temperature of the thermoplastic having the highest glass transition temperature. This is preferred in particular in embodiments of the method according to the invention, in which the thermoplastic particles are melted or pre-melted only in the refiner. However, this is also advantageous in embodiments in which the thermoplastic particles have already been supplied to the refiner already in melted or pre-melted condition, for example, to prevent the thermoplastic particles from cooling to a temperature below the glass transition temperature in the refiner.

In a preferred embodiment of the method according to the invention, the thermal energy required to melt or partially melt the thermoplastic particles is generated at least partially by shear energy in the refiner. In the preferred case of using a disk refiner, for example, such a shear energy can be created, for example, through the choice of the grinding disk spacing, the grinding disk sets, the rotational speed of the grinding disk(s) and the feed (type, pressure and rate of the material to be reduced to fibers) that the thermoplastic material is melted or pre-melted and is bonded to the lignocellulose-containing material that has been reduced to fibers in the radial passage along the grinding set of the stator and rotor. The required thermal energy may optionally be applied exclusively through the resulting shear energy. As indicated above, however, the required thermal energy may also additionally or exclusively be supplied by heating of the grinding set of the refiner, for example, by electric heating or steam.

In a particularly preferred embodiment of the method according to the invention, the refiner is a disk refiner with grinding disks, the thermoplastic particles and the mixture of water and lignocellulose-containing particles is supplied centrally through a grinding disk and the material composite particles are discharged radially or tangentially with respect to the grinding disks. In this way, plastic and lignocellulose material are introduced centrally into the milling gap between the grinding disks, while the compounding (size reduction, mixing and optionally melting) progresses radially or tangentially from the inside to the outside to the edge of the grinding disks, and the resulting composite material is discharged at the outer edges of the grinding disks, where it is collected and optionally treated further, for example, being separated from the suspension liquid.

The resulting material composite particles at least mostly are separated from excess liquid.

The lignocellulose-containing particles are wood shavings, wood chips, wood fibers or sawdust or lignin-free cellulose fibers (CTMP) or wood pulp. This method is not limited to certain types of wood or species of wood.

The thermoplastics may be, for example, polyethylene (PE), polypropylene (PP), acrylonitrile-butadiene-styrene (ABS), polyamide (PA), polylactate (PLA), polymethyl methacrylate (PMMA), polycarbonate (PC), polyethyleneterephthalate (PET), polystyrene (PS), polyether ether ketone (PEEK), thermoplastic starch (TPS) or polyvinyl chloride (PVC), or a mixture thereof. Additives, such as lubricants, adhesion promoters, etc., may be added to the thermoplastics.

The invention also relates to lignocellulose-plastic composite material which is or can be produced by a method according to the invention.

The invention is explained in greater detail below on the basis of the accompanying figures and exemplary embodiments merely for illustrations purposes.

Figure 1:
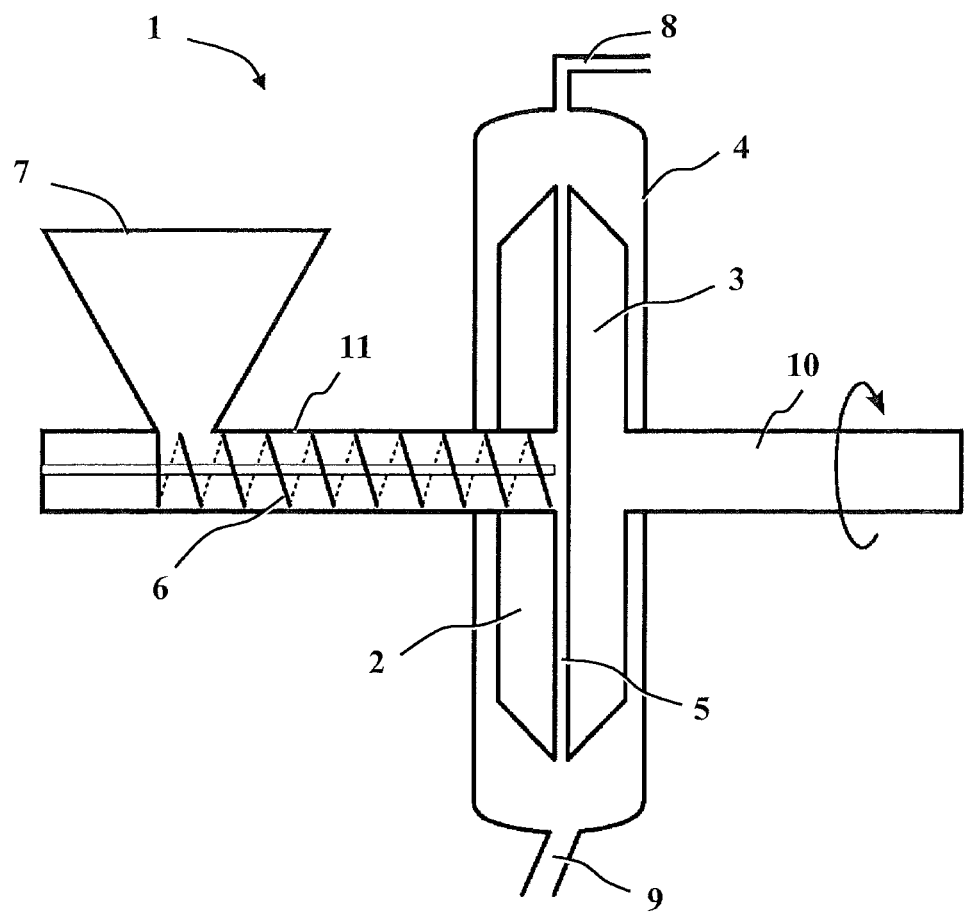
FIG. 1 shows a schematic diagram of a preferred embodiment of a device for carrying out the method according to the invention.

FIG. 1 shows schematically the design of an experimental refiner used in the exemplary embodiment 1 (see below). The refiner 1 is a disk refiner with two grinding disks 2, 3, which form a milling gap 5 in a housing 4. The first grinding disk (stator grinding disk) 2 is stationary, while the second grinding disk (rotor grinding disk) 3 rotates around the axle 10, as indicated by the arrow. A screw conveyor 6 is arranged in the hollow axle 11 of the stator grinding disk 2, such that the material to be milled can be introduced centrally into the milling gap 5. The material to be milled can be charged to the conveyor screw 6 through a hopper 7.

The housing 4 has a line 8 on its top side, through which steam can be introduced into the interior of the housing 4. An outlet 9 is provided at the bottom of the housing 4, through which the finished product can be removed from the housing 4.

Figure 2:
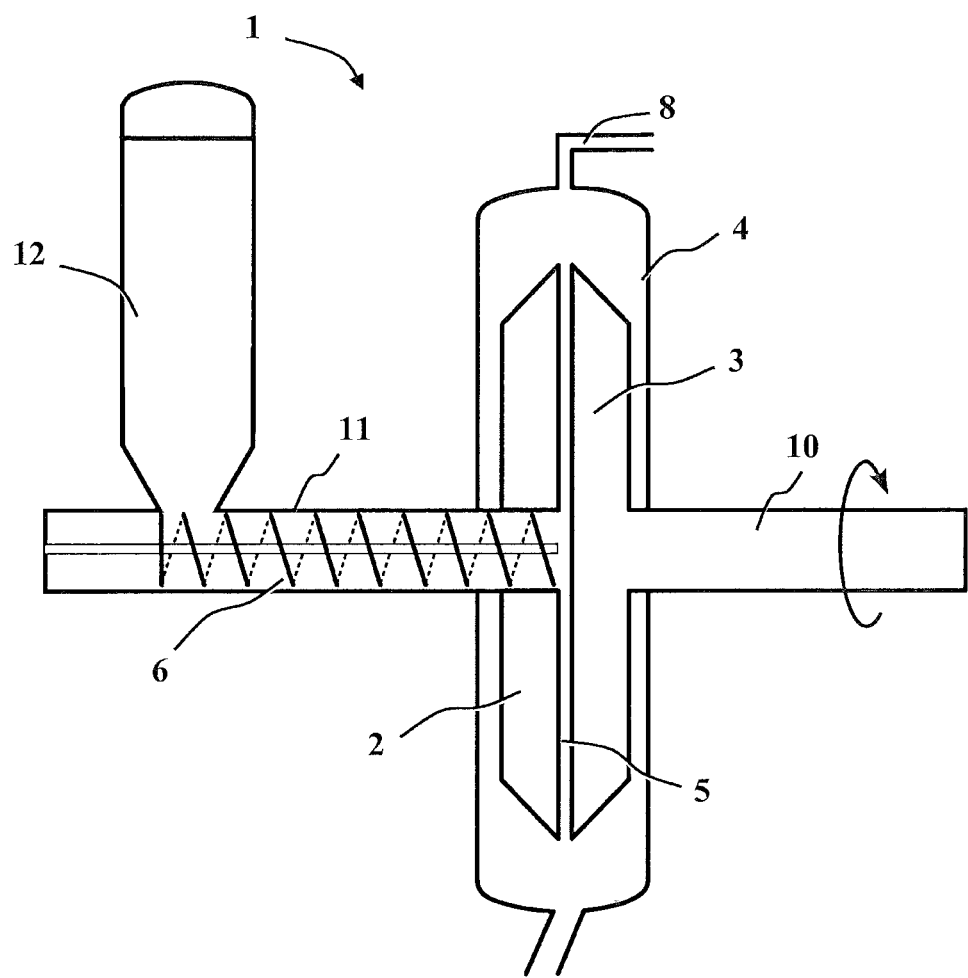
FIG. 2 shows a schematic diagram of another preferred embodiment of a device for carrying out the method according to the invention.

FIG. 2 shows schematically the design of a refiner, such as that used in exemplary embodiment 2. The refiner 1 differs essentially in that a cooker 12 has been used instead of a hopper 7.

EXEMPLARY EMBODIMENT 1

For the experiments described below, a low-density polyethylene (LDPE) and spruce sawdust have been used for wet compounding according to the invention. A mixing ratio of 60% spruce shavings and 40% LDPE (amounts by weight) was used for this purpose. Before reducing these components to fibers in the refiner, the sawdust was precooked in a so-called paddle reactor for 6 minutes at 170° C. In doing so, 10 L of water were added to 5 kg shavings. The middle lamella of the wood fibers was softened due to such a hydrothermal pretreatment, so that the modulus of elasticity drops, and the reduction of the particles to fiber in the refiner is facilitated. In an industrial production process, such as MDF production, the precooking of the chips and the subsequent reduction to fibers are carried out in a continuous process, such that from the cooker to the refiner is a closed pressure system at temperatures of 170° C. to 200° C. at 6 to 12 bar. However, the experimental refiner used here was an open system, in which temperatures of 100° C. could be implemented. Immediately after precooking the chips, the weighed polymer in granular form was manually undermixed into the softened shavings and sent to the refiner without further treatment (screening, pressing or the like).

For melting or partial melting of the polymer in refiner 1, the refiner 1 here was heated with steam (temperature T approx. 100° C.) through line 8 and preheated (see FIG. 1). Because of the open system, the preheating of the refiner 1 by steam was possible only up to a temperature of approx. 100° C. Further input of energy that causes melting or partial melting of the polymer was introduced into the system by shear energy generated by reduction of the chips and shavings to fibers and also reducing the polymer granules to fibers. The refiner 1 was steam-treated continuously during this reduction to fibers.

The grinding disk spacing and thus the thickness of the milling gap 5 were set at 0.5 mm for the wet compounding and reduction to fibers. After turning on the refiner 1 and the screw conveyor unit, the material was sent to the milling unit through the funnel 7, reduced to fibers and discharged through the outlet 9 by centrifugal forces at the lower end of the refiner housing 4. The dwell time of the material in the refiner was 10 seconds from input of the material into the funnel until discharge of the material 9.

The experimental parameters for the experiment described above are given in Table 1.

TABLE 1

Experimental parameters for exemplary embodiment 1

| Experimental parameter | spruce savings and LDPE |
|---|---|
| material | |
| mixing ratio (amount by weight) | 60% spruce shavings |
| | 40% LDPE |
| refiner | Sprout-Waldron 12", 3000 min$^{-1}$ |
| | grinding disk spacing 0.1 mm |
| | grinding disk model: Andritz R243 |
| throughput | approx. 8 kg |
| hydrothermal pretreatment | Paddle Reactor Herbst Machinenbau |
| | Model: 1203027 |
| | T = 170° C. |
| | T = 6 min. |
| steam preheating of refiner | steam generator: model CD9ST |
| | Dino, Bremen |
| | 4 bar (max. 8 bar) |
| | steam outlet: approx. 100° C. |

The prepared wet compound had been drastically reduced to fibers in comparison with the starting material. The polymer was extremely reduced in size in comparison with the starting material and was not discernible with the naked eye. There were visible signs of melted polymer. A subsequent separation of wood and thermoplastic (e.g., by slurrying) was no longer possible.

EXEMPLARY EMBODIMENT 2

Polypropylene (PP) and high-density polyethylene were compounded together with spruce/pine wood chips according to the invention for the experimental procedure described below. The input material moisture of the wood chips was 13%. Table 2 lists the individual experimental parameters as well as the material compositions and specifications. A pressure refiner 1 of the Sprout-Waldron 12" type with an upstream cooker 12 (volume 55 L) was used for this experiment (see FIG. 2). By using a pressurized refiner 1, such as that used in the experimental procedure, it is possible to model industrial conditions over a longer period of time in comparison with Exemplary Embodiment 1.

The material was first mixed by hand with water and then placed in the cooker 12. Before reducing the material to fibers, the materials were heated for up to 10 minutes at 125° C. and 145° C. The disk spacing of the refiner was set at 0.1 mm. After heating the material mixture was transported between the refiner disks by steam pressure (manually controllable), starting from the cooker, and a conveyor screw between the refiner disks, then reduced to fibers there and discharged through centrifugal forces tangentially through a valve opening (10 mm).

Immediately downstream from the flow-through valve, sudden evaporation of the water in the material occurs suddenly, resulting in drying of the material. The wetness of the material immediately downstream from the discharge of the material amounted to 35-40%. The material appeared to have been reduced to fibers to a great extent in comparison with the starting material (chips, granules). The fiber geometry is comparable to that of MDF fibers. The thermoplastic appears to be reduced to fibers and is inseparably bonded to the wooden fibers.

TABLE 2

Experimental parameters for exemplary embodiment 1.

| Experiment No.: | Material | Specific. | Weight dry (kg) | Ratio (%) | Heating t & T (min & ° C.) |
|---|---|---|---|---|---|
| 1 | spruce/pine chips type: Rettenmaier FS 14 | fraction: 2.5-4.0 mm | 7.70 | 70 | 10 min at 125° C. |
|   | HDPE Sabic TC 3054 | density: 0.954 g/cm³ melting point: 132° C. MFI: 30 g/10 min. | 3.3 | 30 | |
| 2 | spruce/pine chips type: Rettenmaier FS 14 | fraction: 2.5-4.0 mm | 5.5 | 50 | 10 min. at 125° C. |
|   | HDPE Sabic TC 3054 | density: 0.954 g/cm³ melting point: 132° C. MFI: 30 g/10 min. | 4.4 | 50 | |
| 3 | spruce/pine chips type: Rettenmaier FS 14 | fraction: 2.5-4.0 mm | 7.7 | 70 | 10 min. at 145° C. |
|   | PP Sabic, PP 575p | density: 0.905 g/cm³ melting point: 160° C. MFI: 10.5 g/10 min. | 3.3 | 30 | |
| 4 | spruce/pine chips type: Rettenmaier FS 14 | fraction: 2.5-4.0 mm | 5.5 | 50 | 10 min. at 145° C. |
|   | PP Sabic, PP 575p | density: 0.905 g/cm³ melting point: 160° C. MFI: 10.5 g/10 min. | 4.4 | 50 | |

Fi = spruce,
Ta = pine,
Specific. = specification,
PP = polypropylene,
HDPE = high-density polyethylene.
The particle size ranges are given under "fraction."

The invention claimed is:

1. A method for producing a lignocellulose-plastic composite material, wherein
thermoplastic particles and a mixture of water and lignocellulose-containing particles are fed to a refiner, and the lignocelluslose containing particles are reduced to fibers in the refiner, and wherein the thermoplastic particles melted or pre-melted only in the refiner so that the melted or pre-melted thermoplastic particles and the lignocellulose-containing particles that have been reduced to fibers than material composite particles in the refiner, and wherein the thermal energy required to melt or partially melt the thermoplastic particles is generated exclusively by (a) shearing energy in the refiner, (b) heating the refiner by electric heating or (c) by a combination of shearing energy in the refiner and heating the refiner by electric heating.

2. The method according to claim 1, wherein the thermoplastic particles and the mixture of water and lignocellulose-containing particles are fed to the refiner jointly or separately.

3. The method according to claim 2, wherein an aqueous suspension of lignocellulose-containing particles and thermoplastic particles is fed to the refiner, and the thermoplastic particles are melted or pre-melted in the refiner, and the lignocellulose-containing particles are reduced to fibers so that the melted or pre-melted thermoplastic particles and the lignocellulose-containing particles that have been reduced to fibers form material composite particles in the refiner.

4. The method according to claim 1, wherein the temperature in the refiner is at or above the glass transition temperature of the thermoplastic particles.

5. The method according to claim 1, wherein the refiner is a disk refiner with grinding disks.

6. The method according to claim 5, wherein a supply of thermoplastic particles and the mixture of water and lignocellulose-containing particles take place centrally through a grinding disk, and material composite particles are discharged radially or tangentially with respect to the grinding disks.

7. The method according to claim 1, wherein the lignocellulose-containing particles are wood particles or lignin-free cellulose fibers (CTMP) or wood pulp.

8. The method according to claim 1, wherein the thermoplastic particles in the particle comprise polyethylene (PE), polypropylene (PP), acrylonitrile-butadiene-styrene (ABS), polyamide (PA) [nylon], polylactate, polymethyl methacrylate (PMMA), polycarbonate (PC), polyethylene terephthalate (PET), polystyrene (PS), polyether ether ketone (PEEK), thermoplastic starch (TPS) or polyvinyl chloride (PVC) or a mixture thereof.

9. The method according to claim 1, wherein the wood particles are wood shavings, wood chips, wood fibers or sawdust.

10. The method according to claim 1, wherein the thermoplastic particles and the mixture of water and lignocellulose-containing particles are fed to the refiner jointly.

* * * * *